(12) United States Patent
VanRooven et al.

(10) Patent No.: US 6,591,376 B1
(45) Date of Patent: Jul. 8, 2003

(54) METHOD AND SYSTEM FOR FAILSAFE RECOVERY AND UPGRADE OF AN EMBEDDED OPERATING SYSTEM

(75) Inventors: Robert Martinez VanRooven, Antelope, CA (US); Kenneth Edward Crawford, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/517,026

(22) Filed: Mar. 2, 2000

(51) Int. Cl.[7] .................................................. H02H 3/05
(52) U.S. Cl. ................... 714/36; 714/13; 713/2
(58) Field of Search .................. 714/13, 36; 713/2; 717/172, 173

(56) References Cited

U.S. PATENT DOCUMENTS 5,325,532 A * 6/1994 Crosswy et al. ............... 713/2
5,708,776 A * 1/1998 Kikinis ........................ 714/55
5,835,695 A * 11/1998 Noll ............................. 714/6
6,195,695 B1 * 2/2001 Cheston et al.
6,317,845 B1 * 11/2001 Meyer et al. ................ 714/23
6,442,623 B1 * 8/2002 Kim ............................ 710/8
6,490,722 B1 * 12/2002 Barton et al. ............... 717/174

* cited by examiner

Primary Examiner—Scott Baderman
Assistant Examiner—Joshua Lohn

(57) ABSTRACT

A method and system for failsafe recovery and upgrade of an operating system embedded within a peripheral or consumer electronic device. The method and system involves replacing current implementations that use ROM memory to store a copy of the embedded operating system, or critical portions thereof, with a disk-based ROM and redundant backup copies of the initial operating system kernel and the primary image required for booting the final embedded operating system. By maintaining critical files in read-only partitions, the robustness and reliability achieved using ROM memory in currently available devices can be achieved without expensive ROM memory via the disk-based ROM.

19 Claims, 4 Drawing Sheets

METHOD AND SYSTEM FOR FAILSAFE RECOVERY AND UPGRADE OF AN EMBEDDED OPERATING SYSTEM

TECHNICAL FIELD

The present invention relates to embedded operating systems and, in particular, to a method and system, for upgrade and recovery of an embedded operating system that do not rely on read-only memory.

BACKGROUND OF THE INVENTION

Computer operating systems represent a well-known and mature technology of fundamental importance to the computer hardware and software industries. Computer operating systems have evolved into relatively large collections of software programs and routines that provide an interface between the processing hardware of a computer system and the users of that processing capability, including human users, application programs, peripheral devices, appliances, and remote devices and computers interconnected with the computer system via one or more communications networks. For example, a computer operating system is responsible for managing the internal memory resources of a computer system and allocation of those resources to active processes, as well as for managing loading and execution of programs associated with active processes and multiplexing of concurrently active processes. Computer operating systems include various device drivers that control peripheral devices interconnected with the computer system and that manage data transfer between the computer system and the peripheral devices, memory management facilities, command interpreters, file system facilities, and many additional functions. Modern computer operating systems are also responsible for providing an interactive environment with which human users interact with the computer system.

Initially, computer systems did not include operating systems. Operating systems evolved to provide efficient and robust servicing of concurrent human users of computer systems. The evolution of operating systems has been tightly coupled to the evolution of computer system hardware capabilities. As the hardware capabilities of peripheral devices and the functions and requirements for peripheral devices have increased, the concept of embedded operating systems that run within peripheral devices, such as printers, has emerged. Embedded operating systems internally manage peripheral and consumer electronic devices just as computer operating systems manage computer systems. In fact, certain operating systems initially developed as computer operating systems are currently being transformed into embedded operating systems for managing peripheral and consumer electronic devices, such as printers, home entertainment devices, and other such electronic devices.

FIG. 1 is a block diagram of a typical computing environment managed by an embedded operating system within a peripheral or consumer electronic device. A typical, high-end device includes a processor 102 that executes an embedded operating system and various software routines that control operation of the device, a random access memory ("RAM") 104, a read-only memory ("ROM") 106, a hard disk or other mass storage device 108, a communications controller, such as an Ethernet controller, fibre channel controller, or modem 110, and various controllers 112 and 114 that control electrical and electromechanical components of the device. In a printer, for example, various controllers, such as controllers 112 and 114, may control electrical motors that feed sheets of paper and that control mechanical and electromechanical components such as print heads, collation mechanisms, and LCD front panel displays and pushbuttons that display information to a user and through which a user may input data to the routines that control operation of the printer. Typically, the processor 102, RAM 104, and ROM 106 may be interconnected via a high speed bus 116, that is, in turn, interconnected with a lower-speed bus 118 via a bus bridge 120. The lower-speed bus 118 typically interconnects the mass storage device 108 and controllers 110, 112, and 114 with the processor 102 and the RAM 104.

In current devices that employ embedded operating systems, instructions that represent the embedded operating system or critical components of the embedded operating system are stored in ROM 106 so that, when the device is powered on, the embedded operating system or critical components of the embedded operating system can be reliably retrieved from ROM for execution by the processor 102. The failure rate of ROM is much lower than the failure rate of mass storage devices so that, by using ROM to store the embedded operating system or critical components of the embedded operating system, the device can be powered up to a functional state even when the mass storage device becomes unreliable or fails completely. ROM data is maintained through power-on and power-off cycles, as is data stored on disk drives, but RAM data is not, and therefore RAM cannot be used for storing non-volatile copies of the embedded operating system. In addition to the critical components of the operating system, called the kernel, an operating system typically requires a data environment, called a file system, in which less frequently invoked routines and data files are stored. This data environment is typically stored in current peripheral and consumer electronic devices in file systems on the mass storage device 108 that allow data to be both read from and written to the file system. However, file systems that allow both reads and writes are potentially error prone, and sufficient robustness of the data can be obtained only by complex and expensive software technologies or combinations of specialized hardware and software technologies.

The kernel and associated data environment that together compose an embedded operating system are referred to as the "primary image." Normally, when errors occur that corrupt the embedded operating system, user intervention is required to rebuild the primary image from stored backup copies of the primary image, routines stored in ROM, or a combination of backup copies and ROM-based information. ROM memory is an expensive component, small in capacity, and is relatively expensive and time-consuming to update. Designers, users, and manufacturers of peripheral and consumer electronic devices have thus recognized the need for robustly storing an embedded operating system within an electronic device without using ROM memory and without using complex software or software and hardware solutions for robustly storing archival copies of primary images. In addition, designers, manufacturers, and users of peripheral and consumer electronic devices have recognized the need for embedded operating systems that can automatically detect and correct file system corruption, including corruption of the primary image, without user intervention, and that can be easily updated to newer or alternate versions from remote locations without extensive user intervention.

SUMMARY OF THE INVENTION

In one embodiment of the present invention within a peripheral or consumer electronic device, a read-only disk partition /boot is employed as a disk-based ROM that stores a failsafe copy of an initial operating system ("OS") kernel as well as a backup copy of a primary image comprising a compressed archive file containing the data environment and operating system routines that are sufficient to boot up and install an embedded operating system. A second generally read-only disk partition /dist stores a backup copy of the primary image as well. The initial OS kernel, upon power-on or other boot event, is instantiated in a RAM-disk partition and runs several script routines that verify the integrity of the primary image and automatically rebuild the primary image in case of corruption. These script routines also perform integrity checks on the /boot partition and can rebuild the /boot partition in the case of a "destructive" upgrade operation invoked as a result of a new primary image that has been downloaded to the /dist partition. By using the /boot partition as a disk-based ROM, the expensive ROM component typically employed in currently available peripheral and consumer electronic devices can be eliminated. Detection and correction of file system corruption is automatic, as is installation and upgrade to a new embedded OS version. Because the /boot partition that serves as disk-based ROM is read-only, corruption of the primary image and OS kernel stored within the /boot partition is extremely improbable, providing the robustness and reliability currently provided by storing critical routines and data in a ROM component.

DETAILED DESCRIPTION OF THE INVENTION

One embodiment of the present invention employs a read-only /boot partition on a 4.1 gigabyte Integrated Device Electronics ("IDE") disk drive as a disk-based ROM for reliably storing a backup primary image and initial OS kernel for an embedded Linux operating system that controls a printer peripheral device. In this embodiment, the printer peripheral device does not include a traditional ROM for storing the OS kernel, as in currently available and previous printer peripheral devices. Duplication and management of backup archives of the primary image provide, in this embodiment of the present invention, the reliability and robustness provided by ROM in currently available and previous peripheral devices. It is important to note that many different embedded operating systems, in addition to the embedded Linux operating system, can be recovered and upgraded with slight changes to the described embodiment.

Figure 2:
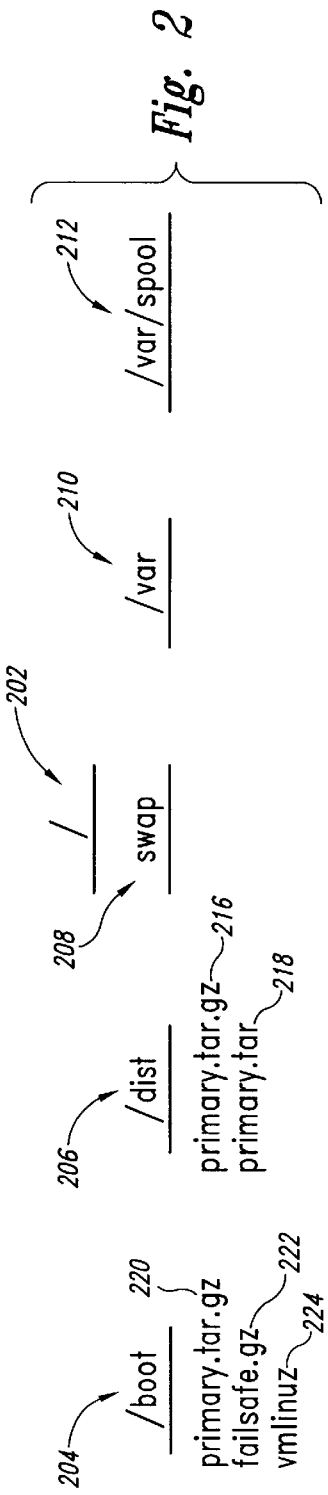
FIG. 2 illustrates partitioning of the hard disk drive according to the described embodiment of the present invention.

FIG. 2 illustrates partitioning of the hard disk drive according to the described embodiment of the present invention. The hard disk drive is partitioned to include a root partition 202, the /boot partition 204, the /dist partition 206, a swap partition 208, a /var partition 210, and a /var/spool partition 212. The embedded operating system supports partitioning of the hard disk drive via the Linux sfdisk command according to the configuration table, stored in the file hda.conf, shown below as Table 1. It should be noted that partitions for an IDE disk drive are normally labeled by strings having the form "/dev/hda" concatenated with an integer, as can be seen in the first column of Table 1, below. Normally, file systems are mounted within partitions. Thus, a reference to the /boot partition is a reference, in the described embodiment, to the partition "/dev/hda1" which serves as the mount point for the file system "/boot." Generally, /boot may be referred to, in the following, as a partition and may be alternately referred to as a file system, depending on the context of the reference. The same alternative referencing may be applied to the other partitions/file systems to be described below.

TABLE 1

| /dev/hda1 | 32   | 83 |
| /dev/hda2 | 512  | 83 |
| /dev/hda3 | 64   | 82 |
| /dev/hda4 | r100 | 5  |
| /dev/hda5 | 64   | 83 |
| /dev/hda6 | 32   | 83 |
| /dev/hda7 | r100 | 83 |

The first column of Table 1 lists the partition labels for each partition, the values in the second column indicate the size, in megabytes ("MB"), of the corresponding partitions, and the values in the third column indicate the partition types of the corresponding partitions, where "83" indicates a Linux native partition, "5" indicates an extended partition, and "82" indicates a Linux swap partition. The 'r' prefix on values in the second column indicate that the partition should expand to the "remaining" space on the disk but should at least be the indicated size in megabytes ("MB").

The standard Linux file fstab contains a description of the partitioning and mount points for file systems for a hard disk drive. The contents of the file fstab, following partitioning of a hard disk drive by sfdisk according to the hda.config file shown in Table 1 and mounting of the various file systems employed in the described embodiment using the Linux mount command, is shown below as Table 2:

TABLE 2

| device    | mount      | fstype | attributes           | freq | pass |
|-----------|------------|--------|----------------------|------|------|
| proc      | /proc      | proc   | defaults             | 0    | 0    |
| /dev/hda5 | /          | ext2   | rw,exec,sync,noauto  | 0    | 0    |
| /dev/hda6 | /var       | ext2   | rw,exec,sync,auto    | 0    | 0    |
| /dev/hda7 | /var/spool | ext2   | rw,exec,auto,grpquota| 0    | 0    |
| /dev/hda3 | none       | swap   | defaults             | 0    | 0    |
| /dev/hda2 | /dist      | ext2   | ro,exec,auto         | 0    | 0    |
| /dev/hda1 | /boot      | ext2   | ro,exec,auto         | 0    | 0    |

Note that the first row in Table 2, describing the partition "/proc," describes a virtual file system that is used by various operating system routines to report information about the OS kernel but that, being a virtual file system, does not correspond to a physical hard disk partition. The first column of Table 2 references a block special device in which the file system indicated in the second column has been mounted. The third column describes the type of file system, where "proc" designates virtual proc file system, "ext2" designates a local file system, "swap" designates a file system used for virtual memory swapping by the Linux operating system. The fourth column of Table 2 lists attributes of the various file systems, including the following attributes: (1) "defaults," an attribute standing for the attributes list "rw, suid,dev,exec,auto,nouser,async;" (2) "rw," an attribute indicating read-write access; (3) "exec," an attribute that indicates that execution of binary files from the file system is allowed; (4) "sync," an attribute that specifies that only synchronous writes to files of the file system are permitted; (5) "noauto," an attribute that indicates that the file system should not be automatically or implicitly mounted; (6) "auto," an attribute that indicates that the file system may be mounted implicitly using the mount option "–a;" (7) "suid," an attribute that indicates enablement set-user-identifier or set-group identifier bits associated with the file system; (8) "async," an attribute that specifies that writes to files of the file system may be carried out asynchronously or, in other words, with intermediate RAM caching; (9) "grpquota," an attribute that specifies the file system is regulated by size quotas as they relate to users or groups; and (10) "ro," an attribute inidcating read-only access.

Referring again to FIG. 2, it can be seen that each of the file systems 202, 204, 206, 208, 210, and 212 corresponds to file systems described by entries in Table 2. In the Linux operating system, directories are specified in hierarchical fashion, starting with the root directory "/." Thus, the top-level directories "/boot," "/dist," "/var," and "/var/spool" along with the root directory "/," each occupies a separate partition. The special file system "swap" and the virtual file system "proc" are not accessible through the file system hierarchy. The /dist partition 206 contains the files "primary.tar.gz" 216 and "primary.tar" 218. The file "primary.tar.gz" is a compressed archive file containing the files that represent the primary image for the operating system. The file "primary.tar" is an uncompressed primary image archive file. The /boot partition 204 contains a number of files including another copy of the file "primary.tar.gz" 220, the file "failsafe.gz" 222, and the file "vmlinuz" 224. The copy of "primary.tar.gz" in the /boot partition is the compressed factory-installed primary image archive file that can be used to restore the primary image in the event of data corruption. The file "failsafe.gz" is a compressed file containing an initial RAM-disk root file system that is loaded upon power up or reboot and that executes a number of script routines, to be described in detail below, that implement that robustness and reliability characteristics of the disk-based ROM of the present invention. The file "vmlinuz" 224 is a compressed Linux embedded operating system kernel.

Figure 1:
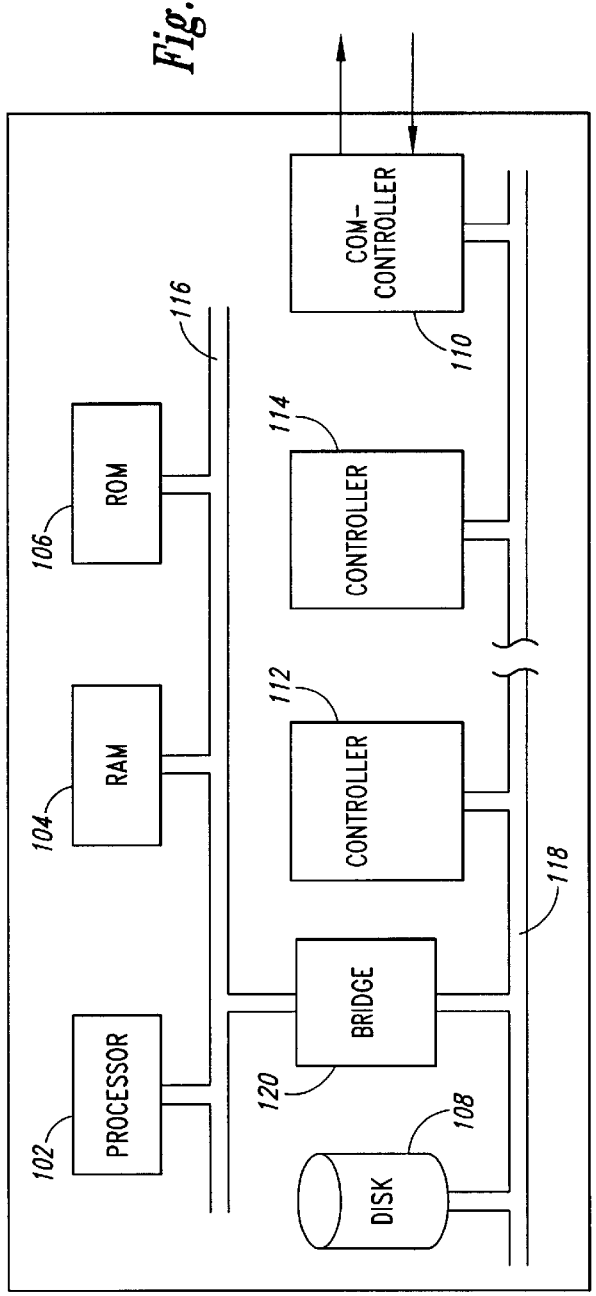
FIG. 1 is a block diagram of a typical computing environment managed by an embedded operating system within a peripheral or consumer electronic device.
Figure 3:
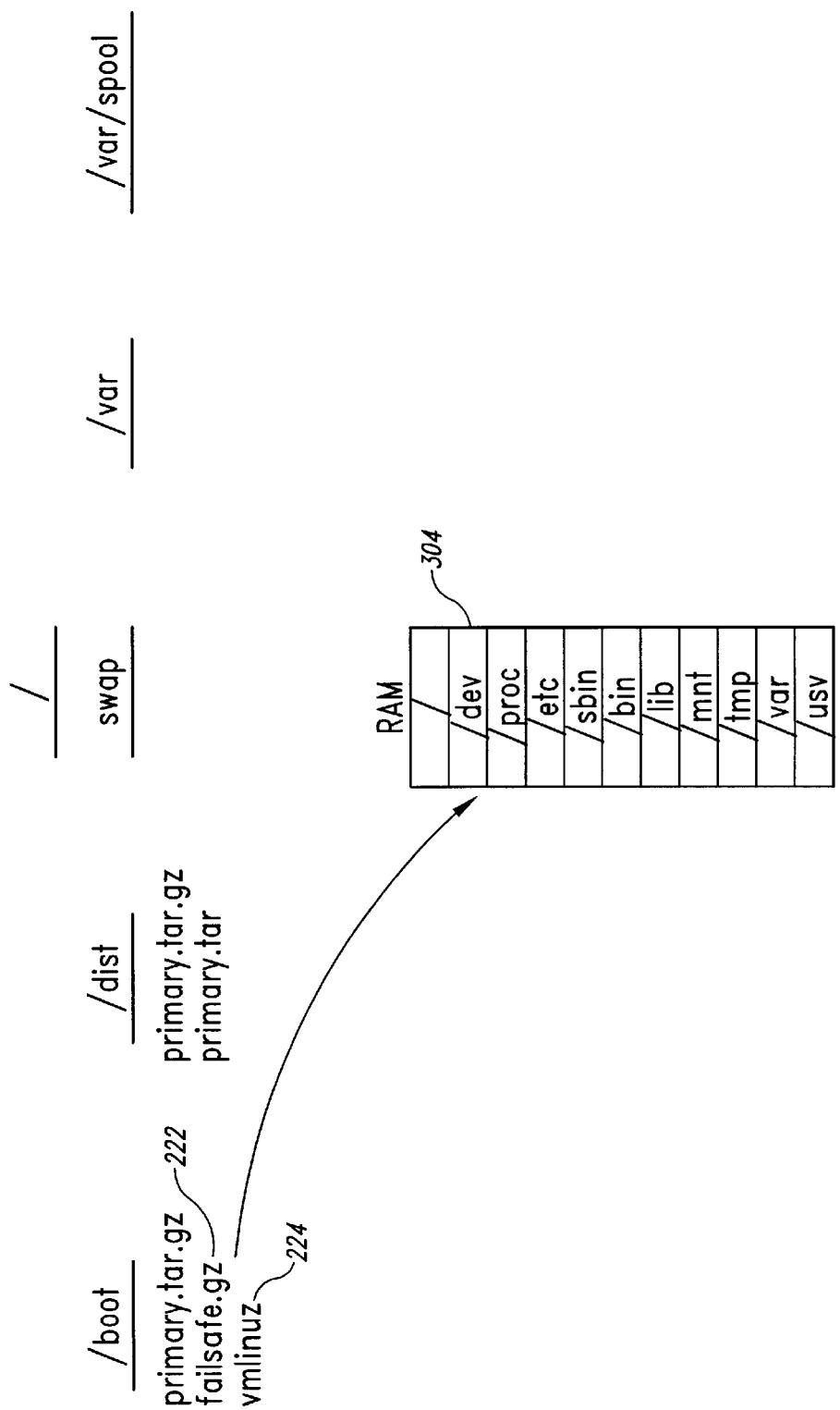
FIG. 3 illustrates the power-on boot process.

FIG. 3 illustrates the power-on boot process. When the appliance that includes the described embodiment of the present invention ("print spooler") is powered on, the contents of the file "failsafe.gz" 222 within the file system "/boot" is uncompressed into an initial RAM-disk file system 304 contained within RAM (104 in FIG. 1). This boot information is specified in the file lilo.conf shown below in Table 3 and processed by the Linux Loader ("LILO").

TABLE 3

```
boot=/dev/hdamap=/boot/map
install=/boot/boot.b
compact
default=failsafe
image=/boot/vmlinuz
    label=failsafe
    root=/dev/hda5
    initrd=/boot/failsafe.gz
    append="root=/dev/hda5 initrd'=/boot/failsafe.gz ramdisk_size =24576k
    read-only
```

This initial OS kernel executes a number of script routines, including the script routines "linuxrc" and "install," to be described below in detail, that check the hard disk for corruption and, if corruption is present, restores the contents of the various file systems. Then, following completion of execution of the script routines "linuxrc" and "install," the primary Linux embedded file system, a copy of which is contained in the file primary.tar.gz 220, is mounted, as directed by the lilo.conf statement "root=/dev/hda5," after the RAM-disk file system is automatically unmounted. Following mounting of the primary Linux embedded file system, the routine '/sbin/init' is executed, which then brings up the rest of the embedded Linux operating system. Note that the same kernel continues to execute for the embedded Linux operating system as for the initial OS, but that additional routines and processes that support additional functionality are included in the embedded Linux operating system.

Figure 4:
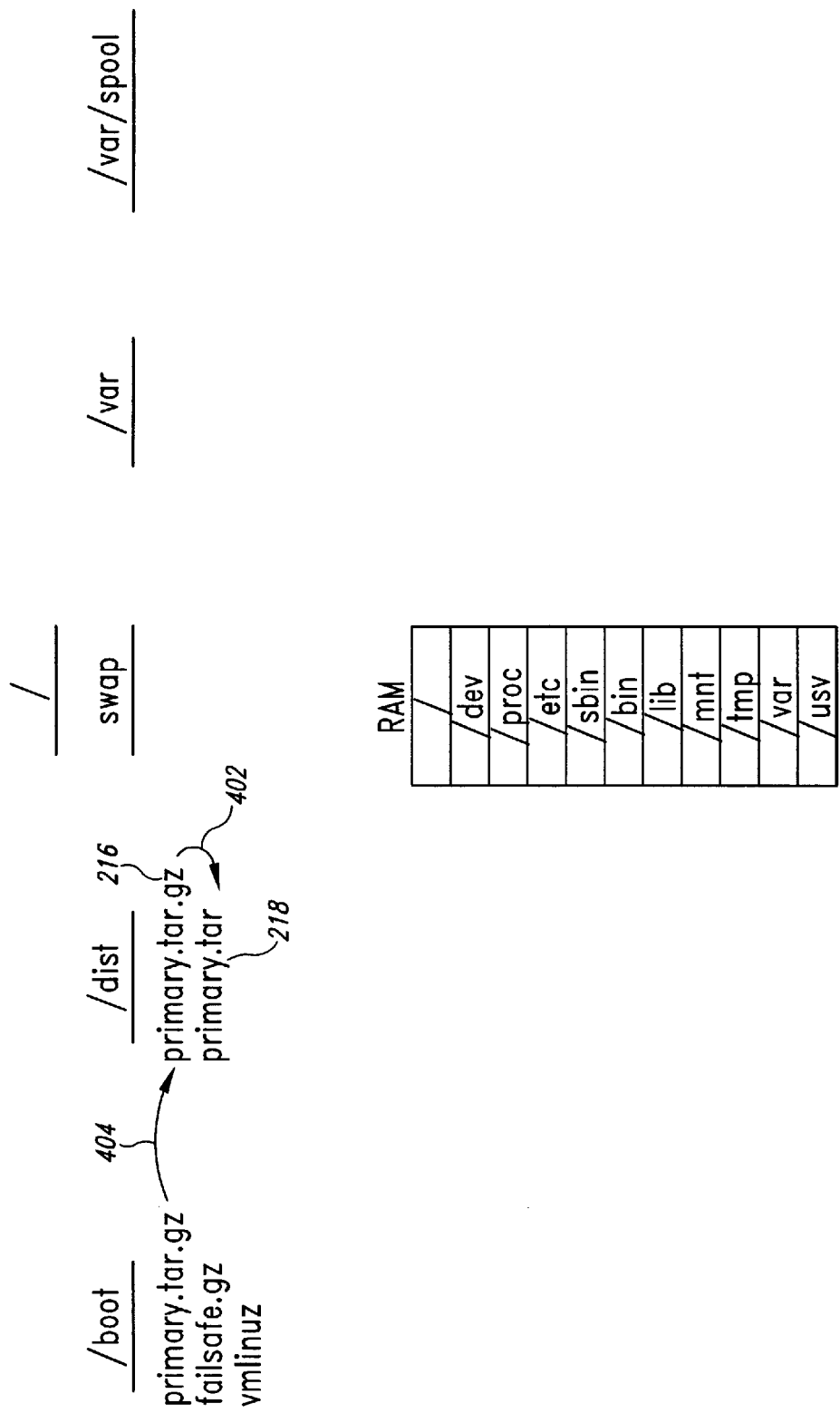
FIG. 4 illustrates two important restoration operations that may be carried out by script routines executed by the initial OS kernel.

FIG. 4 illustrates two important restoration operations that may be carried out by script routines executed by the initial OS kernel. If the initial OS kernel determines that the file "primary.tar" 218 in the file system "/dist" is damaged or corrupt, then the initial OS kernel can recreate this file by uncompressing the file "primary.tar.gz," as indicated by arrow 402. However, if the file "primary.tar.gz" 216 has been corrupted, then the initial OS kernel can replace the corrupted file "primary.tar.gz" with a copy of the file "primary.tar.gz" on the file system "/boot," as indicated in FIG. 4 by arrow 404.

Figure 5:
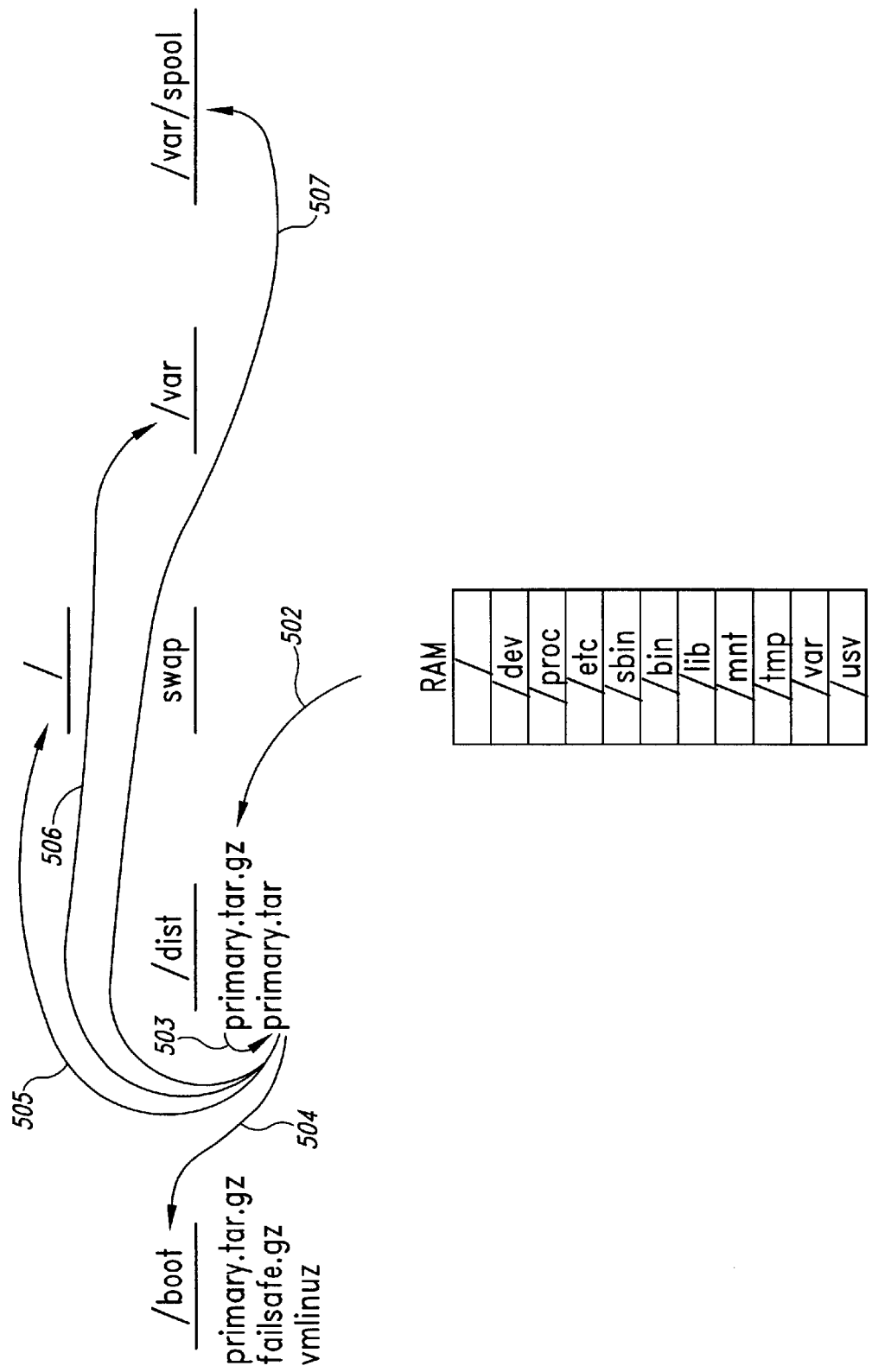
FIG. 5 illustrates the process for downloading a new version of the primary image and/or initial OS kernel and installing the new version.

FIG. 5 illustrates the process for downloading a new version of the primary image and installing the new version. While the print spooler is running, a new version of the primary image may be downloaded via a communications network and stored in the file system "/dist," replacing the current copy of the file "primary.tar.gz," as indicated by arrow 502 in FIG. 5. Following a reboot of the printer, and during execution of a script routine by the initial OS kernel, the presence of the new "primary.tar.gz" file is detected and the new "primary.tar.gz" file is uncompressed, as indicated by arrow 503, to create a new "primary.tar" archive file, which is then provided to the Linux command "tar" to selectively regenerate the "/boot", "/", "/var" "/var/spool" partitions as indicated by arrows 504, 505, 506, and 507 in FIG. 5.

By maintaining the file system "/boot" as read-only, except for very short periods during a destructive installation of a new version of the primary image and/or initial OS kernel, as shown in FIG. 5, the files maintained in the "/boot" partition are essentially incorruptible and serve under the present invention in the same capacity as data instructions stored in ROM in currently-available and prior embedded systems. By automatically detecting file system corruption and newly downloaded OS versions during the booting process, by script routines to be described below, and repairing detected corruption and/or installing newly downloaded OS versions, the described embodiment provides reliability and robustness, previously effected using ROM-based data and instruction storage and complex software mechanisms as well as automatic upgrades, both without requiring user intervention in most cases.

Table 4, below, contains an alternative description of the partitions and file systems described above with reference to Tables 1 and 2 and FIGS. 2–5.

TABLE 4

| Partition | mount | Size (MB) | type | attributes | description |
|---|---|---|---|---|---|
| /dev/hda1 | /boot | 32 | ext2 | ro | failsafe boot partition w/ factory image |
| /dev/hda2 | /dist | 512 | ext2 | ro | distribution point for upgrades |
| /dev/hda3 | swap | 64 | swap | defaults | virtual memory swap space |
| /dev/hda5 | / | 64 | ext2 | rw, sync, exec | primary root partition |
| /dev/hda6 | /var | 32 | ext2 | rw, sync, exec | variable data area, e.g., configuration |
| /dev/hda7 | /var/spool | 3300+ | ext2 | rw.async | variable data area, e.g., spooling, logging |

The /boot partition is the failsafe boot partition that includes a compressed archive of the factory-installed primary image. The /dist partition is the point to which upgrades are downloaded in order to install new or alternate versions of the primary image. The swap partition is disk space used for virtual memory swapping. The root partition "/" is the primary root partition for the system. The /var partition includes files that contain configuration data and other variable data, and the partition "/var/spool" comprises the bulk of high disk space and is used for printing tasks and applications, including spooling, logging, and other such information.

The initial OS kernel invokes three script routines, described below, to check the above-described file systems for corruption, repair any detected corruptions, and to install any new or alternate versions of the primary image and/or initial OS kernel. These script routines include the script routines "linuxrc," "install," and "rc.sysinit," which are discussed in order below. Each script routine, including linuxrc, begins with the number of default definitions comprising string assignments to local variables. The defaults for the routine "linuxrc" are provided below:

```
1    # DEFAULTS
2    PATH="/bin:/sbin:/usr/bin:/usr/sbin"
3    blockSize=4096
4    boot="boot"
5    /boot partition="/dev/hda1"
6    configDelay="5s"
7    configSet="2"
8    confirmDelay="60s"
9    confirmSet="k₁"
10   console="/dev/console"
11   delay="4s"
12   devices="/proc/devices"
13   dist="/dist"
14   /dist partition="/dev/hda2"
15   downArrow="2"
16   etc="/etc"
17   font="/etc/lcd.fnt"
18   frontPanel="/dev/lcd"
19   imageGz="primary.tar.gz"
20   imageTar="primary.tar"
21   interface="eth0"
22   lcd="/lib/modules/lcd"
23   login="anonymous"
24   madk="000"
25   mntRoot="/mnt/root"
26   mntSpool="/mnt/spool"
27   mntVar="/mnt/var"
28   netrc="/.netrc"
29   null="/dev/null"
30   ok="k"
31   password="root@hp.com"
32   power="/dev/sftpower"
33   proc="/proc"
34   product="product"
35   prompt="Debug"
36   pwr="/lib/modules/sftpower"
37   root="/"
38   sbin="/sbin"
39   script="install"
40   tmp="/tmp"
41
```

Next, script routines may include a number of functions used by the main function of the script routines. The functions included in the script routine "linuxrc" follow below:

```
42   # FUNCTIONS
43   # usage: debug <message>
44   function debug( )
45   {
46       message=$1
47
48       # start interactive shell
49       echo $prompt: $message
50       sh
51   }
52
53   # usage: error <activity> [detail]
54   function error( )
55   {
56       activity=$1
57       detail=$2
58
59       # print error message on front panel
```

-continued

```
60          echo -en "\f$activity error!\n" > $frontPanel
61
62          # check for detail argument
63          if [ $# -gt 1 ]; then
64
65                  # print detail argument on front panel
66                  echo -en "($detail)" > $frontPanel
67          fi
68
69          # briefly pause for user viewing
70          sleep $delay
71      }
72
73      # usage: progress <activity> [detail]
74      activity=$1
75      detail=$2
76
77      # print activity message on front panel
78      echo -en "\f$activity . . . \n" > $frontPanel
79
80      # check for detail argument
81      if [ $# -gt 1 ]; then
82
83              # print detail argument on front panel
84              echo -en "($detail)" > $frontPanel
85      fi
86
87      # briefly pause for user viewing
88      sleep $delay
89  }
90
91  # usage: message <activity> [detail]
92  function message ( )
93  {
94      activity=$1
95      detail=$2
96
97      # print activity message on front panel
98      echo -en "\f$activity\n" > $frontPanel
99
100     # check for detail argument
101     uf [ $#-gt 1 ]; then
102
103             # print detail argument on front panel
104             echo -en "($detail)" > $frontPanel
105     fi
106
107     # briefly pause for user viewing
108     sleep $delay
109 }
110
111 # usage: question <activity> [detail]
112 function question( )
113 {
114     activity=$1
115     detail=$2
116
117     # print activity message on front panel
118     echo -en "\f$activity?\n" > $frontPanel
119
120     # check for detail argument
121     if [ $# -gt 1 ]; then
122
123             # print detail argument on front panel
124             echo -en "($detail)" > $frontPanel
125     fi
126 }
127
128 # usage: powerCheck
129 function powerCheck( )
130 {
131     # check if power button was pressed
132     checkpwr
133     if [ $? -gt 0 ]; then
134             progress "Shutting down"
135             umount $/boot partition
136             umount $/dist partition
137             umount -a
138             killpwr
```

-continued

```
139         fi
140     }
141
142     # usage: version string
143     function version_string( )
144     {
145         # parse the boot file
146         while read FILELINE
147         do
148             USED=FALSE
149             FILEHEADER=${FILELINE%=*}
150             if [ ! -z $FILEHEADER ]
151             then
152                 if[ $FILEHEADER = "BUILD" ]
153                 then
154                     BUILD=${FILELINE#BUILD=}
155                 fi
156                 if [ $FILEHEADER = "MAJOR" ]
157                 then
158                     MAJOR=${FILENAME#MAJOR=}
159                 fi
160                 if [ $FILEHEADER = "MINOR" ]
161                 then
162                     MINOR=${FILELINE#MINOR=}
163                 fi
164                 if [ $FILEHEADER = "CONFIDENCE" ]
165                 then
166                     CONFIDENCE=${FILENAME$CONFIDENCE=}
167                 fi
168             fi
169         done < $boot/$product
170
171         # create the label
172         case $CONFIDENCE in
173             r* )
174                 LABEL=r ;;
175             f* )
176                 LABEL=f ;;
177             a* )
178                 LABEL=a ;;
179             b* 0
180                 LABEL=b ;;
181             o* )
182                 LABEL=o ;;
183         esac
184
185         LABEL=$MAJOR.$MINOR.$BUILD$LABEL
186
187         echo -n $LABEL
188     }
189
```

The function "debug," comprising lines 44–51, prints a message to a front panel LCD device of the printer and starts a new instance of the Linux shell command interpreter. The function "debug" allows a developer to continue to interact with the printer. The function "debug" may be disabled, not included in, or changed in production versions of linuxrc as well as in the routine "install," to be discussed below. The function "error," comprising lines 54–71, prints an error message to an LCD device on the front panel. The functions "progress," comprising lines 74–89, "message," comprising lines 92–109, and "question," comprising lines 112–126, print an activity message to an LCD device on the front panel. The function "powerCheck," comprising lines 129–140, checks to see if the power button of the printer has been pressed and, if so, shuts down the print spooler after printing out a shutting down message, explicitly unmounting the boot and disk partitions, and unmounting all other partitions using the Linux command "umount." The function "version_string," comprising lines 143–188, parses a boot file to extract information from the boot file that is concatenated together to form a boot version label file that includes major and minor version numbers and a build label.

The main body of the script routine "linuxrc" is provided below:

```
190     # usage: main
191     function main( )
192     {
193         installFactory=0
194         uncompress=0
195
```

-continued

```
196     # set the environment
197     export PATH
198     unmask $mask
199
200     # create mount points and mount local file systems
201     mount -n -o remount, rw $root
202     mkdir -p $boot
203     mkdir -p $dist
204     mkdir -p $mntRoot
205     mkdir -p $mntSpool
206     mkdir -p $mntVar
207     mkdir -p $proc
208     mkdir -p $tmp
209     mount -a
210
211     # install the LCD driver module
212     insmod -f $lcd
213     major= cat $devices | awk "\\$2==\"lcd\" {print\\$1}"
214     mknod $frontPanel c $major 0
215
216     # install the soft power driver module
217     insmod -f $pwr
218     major= cat $devices | awk "\\$2==\"sftpower\" {print\\$1}"
219     mknod $power c $major 0
220
221     # clear the power button bit by reading it once (temporary)
222     checkpwr
223
224     # set the hostname
225     powerCheck
226     host= mkhost eth0
227     hostname $host
228
229     # provide opportunity for user to restore to factory defaults
230     powerCheck
231     progress Configuring "please wait"
232     choice= 'ask $configDelay $configSet $console'
233     if [ $choice = $downArrow ]; then
234         lcdFont $font $frontPanel
235         question "Reset defaults" "\1=yes, \2=no"
236         choice= 'ask $confirmDelay $confirmSet $console'
237         if [ $choice = $ok ]; then
238             installFactory=1
239             progress Resetting "factory"
240         fi
241     fi
242
243     # verify and mount boot & dist
244     powerCheck
245     progress Verifying "step 1 of 2"
246     e2fsck -a -C 0 $/boot partition
247     if [ $? -gt 1 ]; then
248         error Verifying "boot image"
249         debug Verify $/boot partition
250     fi
251     mount -o ro $/boot partition $boot
252     powerCheck
253     progress Venfying "step 2 of 2"
254     e2fsck -a -C 0 $/dist partition
255     if [ $? -gt 1 ]; then
256         powerCheck
257         progress Formatting "please wait"
258         mke2fs -b $blockSize -q -F $/dist partition
259         installFactory=1
260     fi
261     mount -o ro $/dist partition $dist
262     # Display boot partition version
263     message "Base Version" version_string
264
265     # validate primary image gzip integrity
266     progress Validating "please wait"
267     if [ ! -f $dist/$imageGz ]; then
268         installFactory=1
269     else
270         gzip -t $dist/$imageGz > $null
271         if [ $? -gt0 ]; then
272             installFactory=1
273         fi
274     fi
```

-continued

```
275
276         # restore primary image
277         powerCheck
278         if [ $installFactory -gt 0 ]; then
279             progress Restoring "please wait"
280             mount -o remount, rw, sync $disPartition $dist
281             cp -af $boot/$imageGz $dist
282             rm -f $dist/$imageTar
283             mount -o remount, ro $/dist partition $dist
284         fi
285
286         # validate primary image tar integrity
287         progress Validating "please wait"
288         if [ ! -f $dist/$imageTar ]; then
289             uncompress=1
290         else
291             tar tf $dist/$imageTar > $null
292             if [ $? -gt 0 ]; then
293                 uncompress=1
294             fi
295         fi
296
297         # uncompress primary tar image
298         powerCheck
299         if [ $uncompress -gt 0 ]; then
300             progress Uncompressing "please wait"
301             mount -o remount, rw, sync $/dist partition $dist
302             gzip -cqdf $dist/$imageGz > $dist/$imageTar
303             mount -o remount, ro $/dist partition $dist
304         fi
305
306         # extract script from primary image
307         powerCheck
308         progress Extracting "please wait"
309         tar xf0 $dist/$imageTar sbin/$script > $sbin/$script
310         if [ ! -f $sbin/$script ]; then
311             error Install script
312             debug "unable to extract $sbin/$script"
313         fi
314         chmod +x $sbin/$script
315         $sbin/$script $installFactory $uncompress
316         if [ $ -gt 0 ]; then
317             debug "$script returned an error"
318         fi
319
320         # removing lcd driver
321         rm -f $frontPanel
322         rmmod lcd
323
324         # removing soft power driver module
325         rm -f $power
326         rmmod sftpower
327
328         # unmount
329         cd $root
330         umount $boot
331         umount $dist
332         umount $proc
333         umount -a
334     }
335
336     # BODY
337     main
```

On lines 193–194, linuxrc sets the values of several local variables to 0 (the Boolean value FALSE, by script routine convention). On lines 197–198, linuxrc sets up an environment for execution of the script routine by exporting the path variable, set above in the default section on line 2, via the Linux command export, and setting the file creation mask to the octal value "000" via the Linux command "umask." On lines 201–209, linuxrc mounts all the file systems described above with reference to FIGS. 2–5 and Tables 1–4. On lines 212–214, linuxrc installs a driver module that controls the LCD front panel of the print spooler. On lines 217–219, linuxrc installs a soft power driver module and then, on line 222, clears the power button by reading it once via the soft-power-driver-module command "checkpwr." On line 225, linuxrc calls the function "powerCheck," described above, and then sets the name of the host system on lines 226–227. Note that linuxrc calls the function "powerCheck" periodically throughout the remaining lines in order to detect cycling of the power button by a user in order to shut down the print spooler. On lines 231–241, linuxrc queries a user, via the front panel, whether or not the user wishes to restore factory default settings and, if so, sets the variable "installFactory," on line 238, to 1 (Boolean value TRUE), after which the function "progress" is called to report installation of factory defaults. Note that the function "progress" is called at various points by linuxrc to inform the user, via the front panel LCD, of the activities currently undertaken by linuxrc. On lines 245–250, linuxrc calls the Linux command "e2fsck" to check for integrity of the file system "/boot," and, if possible, repair any defects. If the system command "e2fsck" returns a return value greater than 1, then an unrecoverable error has been detected by e2fsck and linuxrc then calls the functions "error" and "debug" to report the corruption and to provide a new shell command environment to allow a developer to continue to interact with the print spooler via the root console. If, on the other hand, the file system "/boot" is uncorrupted, then, on line 251, linuxrc mounts the file system "/boot" in read-only mode via the Linux command "mount." Similarly, on line 254, linuxrc checks the file system "/dist" for corruption. If the system call "e2fsck" detects an unrecoverable error, then, on line 258, linuxrc calls the Linux routine "mke2fs" to reformat the disk partition /dist and sets the local variable "installFactory" to 1 so that the backup factory image stored in the /boot partition will be copied to the /dist partition. On line 261, linuxrc mounts the /dist partition and, on line 263, linuxrc displays the /boot partition primary image version via the function "version_string." On line 267, linuxrc tests to see whether the primary image file is present in the /dist partition and, if not, sets the local variable "installFactory" to 1 on line 268. Otherwise, on line 270, linuxrc attempts to decompress the primary image file in the /dist partition and, if decompression fails, sets the local variable "installFactory" to 1 on line 272. If the local variable "installFactory" has been set to 1 in the preceding lines, then, on lines 279–283, linuxrc remounts the /dist partition to allow for writing, copies the compressed primary image from the /boot partition to the /dist partition, removes the uncompressed primary image archive from the /dist partition, and then remounts the /dist partition for read-only access. On lines 287–295, linuxrc checks to see if the uncompressed primary image archive file is present in the /dist partition and if the uncompressed primary image archive file can be successfully used by the system routine "tar" to reconstruct a file hierarchy. If the uncompressed primary image archive file is either not present or cannot be manipulated by the routine "tar," then the local variable "uncompress" is set to 1 (Boolean value TRUE). If the local variable "uncompress" has been set to 1, then, on lines 300–303, linuxrc remounts the /dist partition to allow for writing, uncompresses the compressed primary image file to create the uncompressed primary image archive file, and then remounts the /dist partition for read-only access. On lines 308–314, linuxrc extracts the install script, to be described below, from the uncompressed primary image archive file in the /dist partition into the directory "/sbin" via the Linux command "tar" and changes the access mode of the extracted install script to allow it to be executed via the command "chmod." On line 315, linuxrc invokes the script "install", passing to the script "install" the local variables "installFactory" and "uncompress." If the script "install" successfully runs, then the file systems are checked and verified, and reconstructed if necessary. Then, linuxrc removes the LCD driver and soft power drivers on lines 321–322 and 325–326, and then explicitly unmounts the /boot and /dist file systems on lines 330 and 331 and unmounts the remaining file systems on line 333. When linuxrc finishes execution, as discussed above, the primary Linux embedded file system is mounted and the full embedded Linux operating system is brought up, starting with execution of "/sbin/init." However, if the script "install" fails, then, in certain cases, control returns to linuxrc on line 316, in which case linuxrc invokes the function "debug" to start a new shell environment after printing out an error message.

The script routine "install," called by the previously-described script routine "linuxrc," is provided below. First, as with linuxrc, a list of default definitions is provided:

```
1   # DEFAULTS
2   blockSize=4096
3   boot="/boot"
4   bootBranches="boot"
5   /boot partition="/dev/hda1"
6   dateparam="+%a %b %r %Y"
7   delay="ls"
8   disk="/dev/hda"
9   dist="/dist"
10  /dist partition="/dev/hda2"
11  etc="/etc"
12  frontPanel="/dev/lcd"
13  initial="initial"
14  hda="etc/hda.conf"
15  hdaFile="hda.conf"
16  hdaTemp=hda.tmp"
17  lilo="/boot/lilo.conf"
18  lpdDir="lpd"
19  mntRoot=".mnt/root"
20  mntRootPartition="/dev/hda5"
21  mntspool="/mnt/spool"
22  mntSpoolPartition="/dev/hda7"
23  mntVar="/mnt/var"
24  mntVarPartition="/dev/hda6"
25  primaryTar="/primary.tar"
26  primaryTarGz="primary.gar.tz"
27  primary="primary"
28  printcap="etc/printcap"
29  proc="/proc"
30  product="etc/product"
31  productFile="product"
32  prompt="Debug"
33  queuePerms="755"
34  root="/"
35  rootBranches="bin dev etc home lib root tmp sbin usr"
36  spooi="spool"
37  spoolBranches="var/spool"
38  swapPartition="/dev/hda3"
39  tempDir="/tmp"
40  var="var"
41  varBranches="var/cache var/db var/etc var/lib var/local var/lock
    var/log var/nis var/preserve
42  var/run"
43  varSpool="var/spool"
44
```

Next, install includes a set of functions that are called from the main function of install. These functions are provided below:

```
45   # FUNCTIONS
46   # usage: debug <message>
47   function debug( )
48   {
49       message=$1
50
51       # start interactive shell
52       echo $prompt: $message
53       sh
54   }
55
56   # usage: compatible_version <base> <cmp> <gt|lt>
57   # returns true if base is greater than or less than (respectively) compare
58   # base must be full major.minor, build, but cmp may be partial (i.e. major.minor)
59   function compatible_version( )
60   {
61       cmp="-$3"
62       base=$1
63       cmpTo=$2
64
65       while true
66       do
67           baseItem=${base%%.*}
68           cmpItem=${cmpTo%%.*}
69           if [ $cmpItem $cmp $baseItem ]
70           then
71               return -1
72           elif [ $cmpItem != $baseItem ] #means it is less than
73           then
74               return 0
75           fi
76           if [ $cmpTo = ${cmpTo#*.} ]
77           then
78               break
79           fi
80           base=${base#*.}
81           cmpTo=[ ${cmpTo#*.} ]
82       done
83
84       return 0
85   }
86
87   # usage: validate_version <Major> <Minor> <Build> <validity expression>
88   function validate_version
89   {
90       newVer=$1.$2.$3
91       test=$4
92
93       if [ -f/boot/product ]
94       then
95       ./boot/product
96       bootVer=$MAJOR.$MINOR.$BUILD
97
98       while true
99       do
100          output=${test%%,*}
101          if [ $output != ${output#*-} ]
102          then
103              if compatible_version $bootVer ${output#*-} lt
104              then
105                  if compatible_version $bootVer ${output%-*} gt
106                  then
107                      return 0
108                  fi
109              fi
110          else
111              if compatible_version $bootVer $output gt
112              then
113                  if compatible_version $bootVer $newVer lt
114                  then
115                      return 0
116                  fi
117              fi
118          fi
119          if [ $test = ${test#*,} ]
120          then
121              break
122          fi
123          test=${test#*,} ]
```

-continued

```
124         done
125     fi
126
127     return −1
128 }
129
130 # usage: error <activity> [detail]
131 function error( )
132 {
133     activity=$1
134     detail=$2
135
136     # print error message on front panel
137     echo −en "\$activity error!\n" > $frontPanel
138
139     # check for detail argument
140     if [ $# −gt 1 ]; then
141
142         # print detail argument on front panel
143         echo −en "($detail)" > $frontPanel
144     fi
145
146     # briefly pause for user viewing
147     sleep $delay
148 }
149
150 # usage: message <activity> [detail]
151 function message( )
152 {
153     activity=$1
154     detail$2
155
156     # print activity message on front panel
157     echo −en "\f$activity\n" > $frontPanel
158
159     # check for detail argument
160     if [ $# −gt 1 ]; then
161
162         # print detail argument on front panel
163         echo −en "($detail)" > $frontPanel
164     fi
165
166     #briefly pause for user viewing
167     sleep $delay
168 }
169
170 # usage: need_destruct
171 function need_destruct( )
172 {
173     tar −x0f $dist/$primaryTar $product > $tempDir/$productFile
174     .$tempDir/$productFile
175     if validate_version $MAJOR $MINOR $BUILD $BASE
176     then
177         return −1
178     fi
179
180     return 0
181 }
182
183 # usage: need_partition
184 function need_partition( )
185 {
186     tar −x0f $dist/$primaryTar $hda > $tempDir/$hdaFile
187     sfdisk −d/dev/hda > $tempDir/$hdaTemp
188     umount $/boot partition
189     umount $/dist partition
190     parttol −r $tempDir/$hdaTemp −k 2 −p $tempDir/$hdaFile
191     mount −o ro $/boot partition $boot
192     mount −o ro $/dist partition $dist
193
194     return 0
195 }
196 # usage: progress <activity> [detail]
198 function progress( )
199 {
200     activity=$1
```

```
                                -continued
201        detail=$2
202
203        # print activity message on front panel
204        echo −en "\f$activity . . . \n" > $frontPanel
205
206        # check for detail argument
207        if [ $# −gt 1 ]; then
208
209             # print detail argument on front panel
210             echo −en "($detail)" > $frontPanel
211        fi
212
213        # briefly pause for user viewing
214        sleep $delay
215    }
216
217    # usage: powerCheck
218    function powerCheck( )
219    {
220        # check if power button was pressed
221            checkpwr
222        if [ $? −gt 0 ]; then
223            progress "Shutting down"
224            umount $/boot partition
225            umount $/dist partition
226            umount $mntRootPartition
227            umount $mntVarPartition
228            umount $mntSpoolPartition
229            umount −a
230                killpwr
231        fi
232    }
233
```

The function "debug," comprising lines 47–54, echoes a message from the front panel of the printer and then invokes a new shell environment to allow continued interaction of the developer with the print spooler in the face of a unrecoverable error. The function "compatible_version," comprising lines 59–85, compares string representations of a boot version label, to determine whether the version string, supplied as the second argument, is less than or greater than the version strings supplied as the first argument, depending on a comparator operator supplied as the third argument. The function "validate_version," comprising lines 88–178, compares the current major/minor/build version label of the current boot version to a new major/minor/build boot label and to a comma-separated validity expression to determine whether or not the new boot version is greater than the current boot version and the current boot version is less than a boot label contained in the validity expression or whether the current boot version falls within a range of boot versions in the validity expression, in which case the function validate_version returns the value "0." Otherwise, the function "validate_version" returns the value "−1." On lines 93–96, the function "validate_version" calls a shell script in the file "/boot/product" to set the local variable "bootVer" to the major/minor/build boot version label of the current OS. Then, in the while-loop, comprising lines 98–124, the function "validate_version" selects each of the comma-separated terms from the validity expression supplied as a fourth argument. When the selected term is a hyphen-separated version range, the function "validate_version" compares the current boot version to the range, and when the term is a single boot version label, the function "validate_version" compares the current boot version with the new boot version, supplied as arguments 1–3, and to the boot version term selected from the validity expression. The function "error," comprising lines 131–148, prints an error message to the LCD of the front panel of the printer. The function "message," comprising lines 151–168, prints an activity message to the LCD of the front panel of the printer. The function "need_destruct," comprising lines 171–181, extracts the shell script "/boot/product" from the uncompressed primary image archive file in the /dist partition, calls the extracted shell script to determine the boot version label of the primary image, and then calls the function "validate_version" to determine whether the boot version in the uncompressed primary image archive file indicates that a destructive install is required or, in other words, whether the /boot partition needs to be rebuilt due to reception by the print spooler device of a new primary image representing a more recent version. The function "need_partition," comprising lines 184–195, extracts the file hda.conf from the uncompressed primary image archive file in the /dist partition and then compares the extracted file hda.conf to the current hda.conf for the hard disk to determine whether the two files are different, indicating that the hard disk needs to be repartitioned for installing a new primary image. If so, any newly specified partitions are created via a call to the function "parttool" on line 190. The function "progress," comprising lines 198–211, prints an activity message to the front panel LCD. The function "powerCheck," comprising lines 218–232, is similar to the function "powerCheck" included in the previously-described script routine "linuxrc."

The main body of the install script routine is provided below:

```
234    # usage: main <installFactory> <uncompress>
235    function main( )
236    {
237        installRoot=$[ $1 || $2 ]
238        installVar=$[ $1 || $2 ]
239        installSpool=$[ $1 || $2 ]
240
241        # make swap partition
242        powerCheck
243        progress Formatting "please wait"
244        mkswap $swapPartition
245
246        # determine if the boot section needs to be updated (a destructive upgrade)
247        powerCheck
248        progress Verifying "step 1 of 5"
249        if [ $installRoot –gt 0 ]
250        then
251            if need_destruct
252            then
253                powerCheck
254                progress Upgrading "don't unplug!"
255                mount –o remount, rw, exec $/boot partition
256                cd $root
257                tar –xf $dist/$primaryTar $bootBranches
258                cp $dist/$primaryTarGz $boot
259                lilo _C $lilo
260                mount –o remount, ro, exec $/boot partition
261                mount –o remount, rw, exec $/dist partition
262                rm –f $dist/$primaryTar
263                mount –o remount, ro, exec $/dist partition
264                progress Rebooting
265                umount $/boot partition
266                umount $/dist partition
267                umount $proc
268                umount –a
269                reboot
270            fi
271        fi
272        # determine if the drive needs to be repartitioned
273        powerCheck
274        progress Verifying "step 2 of 5"
275        if [ $installRoot –gt 0 ]
276        then
277            need_partition
278        fi
279
280        # verify and mount root file systems
281        powerCheck
282        progress Verifying "step 3 of 5"
283        e2fsck –a –C 0 $mntRootPartition
284        if [ $? –gt 1 ]; then
285            powerCheck
286            progress Formatting "please wait"
287            mke2fs –b $blockSize –q –F $mntRootPartition
288            installRoot=1
289        fi
290        mount –n –o ro $mntRootPartition $mntRoot
291
292        # verify and mount var file systems
293        powerCheck
294        progress Verifying "step 4 of 5"
295        e2fsck –a –C 0 $mntVarPartition
296        if [ $? –gt 1 ]; then
297            powerCheck
298            progress Formatting "please wait"
299            mke2fs –b $blockSize –q –F $mntVarPartition
300            installVar=1
301        fi
302        mount –n –o ro $mntVarPartition $mntVar
303
304        # verify and mount Spool file systems
305        powerCheck
306        progress Verifying "step 5 of 5"
307        e2fsck –a –C 0 $mntVarPartition
308        if [ $? –gt 1 ]; then
309            powerCheck
310            progress Formatting "please wait"
311            mke2fs –b $blockSize –q –F $mntSpoolPartition
312            installSpool=1
```

-continued

```
313        fi
314        mount −n −o ro $mntSpoolPartition $mntSpool
315
316        # check for previous root image install
317        if [ ! −f $mntRoot/$initial ]; then
318            installRoot=1
319        fi
320
321        # check for previous var image install
322        if [ ! −f $mntVar/$initial ]; then
323            installVar=1
324        fi
325
326        # check for previous spool image install
327        if [ ! −f $mntSpool/$initial ]; then
328            installSpool=1
329        fi
330
331        # install root image
332        powerCheck
333        if [ $installRoot −gt 0 ]; then
334            progress Installing "step 1 of 2"
335            cd $mntRoot
336            mount −n −o remount, rw, sync $mntRootPartition $mntRoot
337            rm −fR
338            progress Installing "step 2 of 2"
339            tar xf $dist/$primaryTar $rootBranches
340            date "$dateparam" > $mntRoot/$initial
341            mount −n −o remount, ro $mntRootPartition $mntRoot
342        fi
343
344        # install var image
345        powerCheck
346        if [ $installVar −gt 0 ]; then
347            progress installing "step 1 of 4"
348            cd $mntVar
349            mount −n −o remount, rw, sync $mntVarPartition $mntVar
350            rm −fR*
351            progress Installing "step 2 of 4"
352            tar xf $dist/$primaryTar $varBranches
353            progress Installing "step 3 of 4"
354            cp −af $var/*.
355            mkdir $spool
356            progress Installing "step 4 of 4"
357            rm −fR $var
358            date "$dateparam" > $mntVar/$initial
359            mount −n −o remount, ro $mntVarPartition $mntVar
360        fi
361
362        # install spool directories
363        powerCheck
364        if [ $installSpool −gt 0 ]; then
365            progress Installing "step 1 of 5"
366            cd $mntSpool
367            mount −n −o remount, rw, sync $mntSpoolPartition $mntSpool
368            rm −fR *
369            progress Installing "step 2 of 5"
370            tar xf $dist/$primaryTar $spoolBranches
371            progress Installing "step 3 of 5"
372            cp −af $varSpool/*.
373            progress Installing "step 4 of 5"
374            rm −fR $varSpool
375            progress Installing "step 5 of 5"
376            cd $1pdDir
377            while read $1pdLine
378            do
379                if [ ! −z $1pdLine ]
380                then
381                    $1pdQueue=${1pdLine#*sd=}
382                    $1pdQueue=${1pdQueue%%:*}
383                    mkdir $1pdQueue
384                    chmod $queuePerms $1pdQueue
385                fi
386            done < $mntVar/$printcap
387            date "$dateparam" > $mntSpool/$initial
388            mount −n −o remount, ro $mntSpoolPartition $mntSpool
389        fi
390
391        # unmount and exit
```

-continued

```
392      cd $root
393      umount -n $mntRoot
394      umount -n $mntSpool
395      umount -n $mntVar
396
397      exit 0
398   }
399
400   # BODY
401   main $1 $2
```

Note that, as with the previously-described script routine "linuxrc," the script routine "install" periodically calls the function "powerCheck" to detect power shutoffs. Also, the script routine "install" periodically prints out progress messages to the front panel LCD. On line 244, install calls the Linux command "mkswap" to set up the swapping partition for virtual memory paging. On lines 249–271, install determines whether a destructive upgrade has been indicated explicitly, via arguments passed into instal, or whether a newly downloaded primary image has a more recent version number than the current primary image, indicating the need for a destructive upgrade and, in either case, proceeds with a destructive upgrade on lines 254–269. First, the /boot partition is remounted to allow for writes on line 255. Then a directory change is made to the root directory on line 256 and the uncompressed primary image archive file is processed using the Linux command "tar," on line 257, to extract the primary image from the uncompressed primary image archive and place the appropriate files and directories within the file systems of the hard disk. Then, on line 258, a compressed primary image file is copied from the /dist partition to the /boot partition and, on line 259, a new boot loader is installed into the system via the Linux command lilo. On line 260, the /boot partition is remounted for read-only access. Thus, lines 256–259 represent the only time that the /boot partition is exposed to write access. As discussed above, at all other times the /boot partition has read-only access and therefore is protected from corruption. On line 261, the /dist partition is remounted for write access, and the uncompressed primary image archive file in the /dist partition is removed on line 262, followed by remounting of the /dist partition for read-only access. Finally, the system is rebooted using the command "reboot," on line 269, which will end processing of install and eventually invoke the script routine "linuxrc," previously described above. On lines 275–278, install determines whether the disk drive needs to be repartitioned and, if so, effects the repartitioning. On lines 282–288, install calls the Linux command e2fsck to verify integrity of the / partition and, if an unrecoverable corruption is detected, reformats the / partition via the Linux command mke2fs, on line 287, additionally setting the local variable "installRoot" to 1 on line 288, to indicate that the files for the root partition need to be reinstalled. Similarly, install checks the /var and /var/spool partitions for corruption and reformats those partitions upon detecting unrecoverable corruption on lines 295–303. On lines 316–329, install additionally checks to make sure that "install" files are located within each of the verified partitions and, if not, sets appropriate local variables to indicate that the files of the partitions must be reinstalled. Finally, in three blocks of code comprising lines 333–342, 346–360, and 364–389, install reinstalls the files of the /, /var, and /var/spool partitions by extracting the appropriate files from the uncompressed primary image archive file on the /dist partition.

The script "rc.sysinit" is called upon booting of the primary image or, in other words, during the transition from the initial OS kernel to the full Linux embedded operating system that controls the print spooler except during the initial booting and configuration of the print spooler. The script "rc.sysinit" is provided below:

```
1     # DEFAULTS
2     boot="/boot"
3     delay="ls"
4     devices="/proc/devices"
5     dist="/dist"
6     frontPanel="/dev/lcd"
7     lcd="/lib/modules/lcd"
8     mounts="/proc/mounts"
9     mtab="/etc/mtab"
10    network="/lib/modules/pcnet32.o"
11    proc="/proc"
12    var="/var"
13
14    # Set the path
15    PATH=/bi:/sbin:/usr/bin:/usr/sbin
16    export PATH
17
18    # Mount local file systems
19    echo "Mounting local file systems."
20    mount -n -o remount, rw, exec, sync/
21    if [ ! -s $boot ]; then
22        mkdir -p $boot
23    fi
24    if [ ! -s $dist ]; then
```

-continued

```
25        mkdir –p $dist
26     fi
27     if [ ! –s $proc ]; then
28        mkdir –p $proc
29     fi
30     if [ ! –s $var ]; then
31        mkdir –p $var
32     fi
33     rm –f $mtab
34     mount –a
35
36     # Update mtab
37     cp –af $mounts $mtab
38
39     # Install the LCD driver module
40     insmod –f $lcd
41     major= `cat $devices | awk \\$2==\lcd\" {printf\\$1}'"
42     rm –f $frontPanel
43     mknod $frontPanel c $major 0
44
45     # First message to the user via the LCD
46     echo –en "\fInitializing . . .\n" > $frontPanel
47     echo –en "(please wait)" > $frontPanel
48
49     # Start up swapping.
50     echo "Activating swap partitions"
51     swapon –a
52
53     # Start up the networking module
54     insmod –f $network
55
56     # Create hostname
57     if [ ! –f/var/hostname.initial ]; then
58        /usr/local/bin/SetHostName.py
59        touch/var/hostname.initial
60     fi
61
62     # Read in config data.
63     if [ –f/etc/sysconfig/network ]; then
64        ./etc/sysconfig/network
65     else
66        NETWORKING=no
67        HOSTNAME=localhost
68     fi
69
70     # Set the hostname.
71     hostname ${HOSTNAME}
72     echo hostname: 'hostname'
73
74     if[ ! –f/etc/HOSTNAME ]; then
75        echo ${HOSTNAME} > /etc/HOSTNAME
76     fi
77
78     # Enable disk quotas for all local file systems
79     if [ –x/sbin/quotaon ]; then
80        echo "Turning on user and group quotas for local filesystems"
81        /sbin/quotaon –a
82     fi
83
84     # Clean out/etc.
85     >/var/run/utmp
86
87     # Delete UUCP lock files.
88     rm –f/var/lock/LCK*
89
90     # Delete stale subsystem files.
91     rm –f/var/lock/sybsys/*
92
93     # Update kernel lock
94     if [ –n "$KERNELD" ]; then
95        touch/var/lock/subsys/kerneld
96     fi
97
98     # Delete stale pid files
99     rm –f/var/run/*.pid
100
101    # Delete Postgres sockets
102    rm –f/tmp/.s.PGSQL.*
103
```

-continued

```
104    # Set the system clock.
105    echo −n "Setting clock"
106    ARC=0
107    UTC=0
108    if [ −f/etc/sysconfig/clock ]; then
109        ./etc/sysconfig/clock
110
111        # convert old style clock config to new values
112        if [ "${CLOCKMODE}" = "GMT" ]; then
113            UTC=true
114        elif [ "${CLOCKMODE}" = "ARC" ]; then
115            ARC=−true
116        fi
117    fi
118    if [ −x/sbin/hwclock ]; then
119        CLOCKFLAGS="− −hctosys"
120        CLOCK=/sbin/hwclock
121    else
122        CLOCKFLAGS="−a"
123        CLOCK=/sbin/clock
124    fi
125    case "$UTC" in
126        yes | true)
127        CLOCKFLAGS="$CLOCKFLAGS −u";
128        echo −n " (utc)"
129        ;;
130    esac
131    case "$ARC" in
132        yes | true)
133        CLOCKFLAGS="$CLOCKFLAGS −A";
134        echo −n " (arc)"
135        ;;
136    esac
137    echo −n ":"
138    $CLOCK $CLOCKFLAGS
139    date
140
141    # Initialize the serial ports.
142    if [ −f/etc/rc.d/rc.serial ]; then
143        ./etc/rc.d/rc.serial
144    fi
145
146    # Now that we have all of our basic modules loaded and the kernel going,
147    # let's dump the syslog ring somewhere so we can find it later
148    dmesg > /var/log/dmesg
149
150    # Clean out the watchdog, i.e., "cujo" log
151    rm −f/var/jog/cujo/*
152
153    # Feed entropy into the entropy pool
154    /etc/rc.d/init.d/random start
```

The above script "rc.sysinit" is provide for completeness of description of the described embodiment of the present invention, but will not be described to the same level of detail as the scripts "linuxrc" and "install" are described above, since the script "rc.sysinit" does not manipulate the primary image files in the /boot and /dist partitions that, along with the script routines "linuxrc" and "install," embody a large portion of the disk-based ROM feature of the present invention. The script routine "rc.sysinit" sets the path variable on line 15 and mounts all the file systems on lines 20–34. Then, rc.sysinit installs the LCD driver module on lines 40–43, starts up virtual memory swapping on line 51, loads a networking module on line 54, creates a host name, if necessary, on lines 58–59, and, on lines 63–68, reads in a configuration data file or sets local variables "NETWORKING" and "HOSTNAME" indicating that the configuration file could not be found and that networking cannot therefore be enabled. Then, in the remaining code, rc.sysinit enables a disk quota mechanism for the local file systems, performs maintenance on certain local files, sets the system clock, and sets up networking and initializes serial ports.

Although the present invention has been described in terms of a particular embodiment, it is not intended that the invention be limited to this embodiment. Modifications within the spirit of the invention will be apparent to those skilled in the art. For example, the present invention may be implemented in many different computer languages with any number of different modular, functional, and data structure organizations. The particular partitionings of hard disk drives included in electronic devices may vary, the types of hard disk drives included in the electronic devices may vary, and the present invention may be practiced in a wide variety of peripheral and consumer electronic devices that use embedded operating systems for control. The primary images may be stored in a single archival file, multiple archival files, single compressed archival files, or multiple compressed archival files. Various types of access privilege assignment strategies may be applied to guarantee that the ROM-disk feature of the present invention provides robust and reliable storage of the backup primary image and other critical files. In the described embodiment, the Linux operating system served as the embedded operating system, but the techniques employed in the described embodiment may also be used to support failsafe recovery and upgrade of other embedded operating systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for failsafe recovery of an embedded operating system within an electronic device that does not store operating system instructions or data in a read-only electronic memory, the method comprising:

booting an initial operating system kernel to run within the electronic device;

checking a boot disk partition for corruption, checking a distribution disk partition for corruption and formatting the distribution disk partition if corruption is found;

checking the distribution disk partition for the presence of a primary image, and, if a primary image is not found, copying a backup primary image from the boot disk partition to the distribution disk partition;

checking a primary image within the distribution disk partition for corruption, and, if corruption of the primary image is found, copying a backup primary image from the boot disk partition to the distribution disk partition to replace the primary image containing the corruption; and mounting a final embedded operating system file system and launching the embedded operating system.

2. The method of claim 1 further including, following checking the primary image within the distribution disk and prior to mounting the final embedded operating system file system and launching the embedded operating system:

determining if the primary image in the distribution disk partition has a more recent version label than the backup primary image in the boot disk partition;

if the primary image in the distribution disk partition has a more recent version label than the backup primary image in the boot disk partition, rebuilding the boot disk partition and booting an initial operating system to run within the electronic device in the context of a simulated disk partition in random access memory; and if the primary image in the distribution disk partition does not have a more recent version label than the backup primary image in the boot disk partition, verifying all additional disk partitions, reformatting any of the additional disk partitions that are found to be corrupted, rebuilding any of the additional disk partitions that have been reformatted and rebuilding all of the additional disk partitions if the primary image in the distribution disk partition has a later version than the primary image from which the disk partitions were originally built.

3. The method of claim 2 further including, prior to booting the initial operating system:

downloading a new primary image into a distribution disk partition.

4. The method of claim 3 wherein the boot partition is maintained in a read-only access mode except during rebuilding of the boot disk partition.

5. The method of claim 1 wherein the initial operating system runs in the context of a simulated disk partition in random access memory.

6. The method of claim 1 wherein the initial operating system invokes a first script routine to check the boot disk partition for corruption, check the distribution disk partition for corruption and format the distribution disk partition if corruption is found, check the distribution disk partition for the presence of a primary image, and, if a primary image is not found, copy a backup primary image from the boot disk partition to the distribution disk partition, and check the primary image within the distribution disk partition for corruption, and, if corruption of the primary image is found, copy a backup primary image from the boot disk partition to the distribution disk partition to replace the primary image containing the corruption.

7. The method of claim 6 wherein the first script routine extracts a second script routine from the primary image in the distribution disk partition and executes the second script routine to determine if the primary image in the distribution disk partition has a more recent version label than the backup primary image in the boot disk partition, and, if the primary image in the distribution disk partition has a more recent version label than the backup primary image in the boot disk partition, rebuild the boot disk partition and boot the initial operating system, and otherwise to verify all additional disk partitions, reformatting any disk partitions that are found to be corrupted, rebuilding the additional disk partitions that have been reformatted and rebuilding all additional disk partitions if the primary image in the distribution disk partition has a later version than the primary image from which the disk partitions were originally built.

8. The method of claim 1 wherein the primary image located within the distribution disk partition comprises a compressed primary image archive file and an uncompressed primary image archive file and wherein the backup primary image stored within the boot partition comprises a compressed primary image archive file.

9. The method of claim 8 wherein files required for operation of the embedded operating system and application routines running on the electronic device are extracted from the uncompressed primary image archive file located within the distribution disk partition in order to rebuild the boot partition and the additional disk partitions.

10. The method of claim 9 wherein the Linux operating system is used as the embedded operating system.

11. The method of claim 10 wherein the Linux system routine e2fsck is used to check the boot partition, distribution disk partition, and additional disk partitions for corruption, wherein the Linux system routine tar is used to generate the compressed primary image archive file and extract files required for operation of the embedded operating system and application routines running on the electronic device from the uncompressed primary image archive file, and wherein the Linux system routines gzip and gunzip are used to compress and uncompress the primary image archive file.

12. An electronic device controlled by an embedded operating system, the electronic device not storing operating system instructions or data in a read-only electronic memory, the method comprising:

a processor and random access memory;

a hard disk partitioned to include a boot disk partition and a distribution disk partition;

a primary image stored in the distribution disk partition;

a backup primary image stored in the boot partition; and a number of routines executed by the processor following booting of the electronic device that verify the distribution and boot disk partitions and rebuild the primary image in the distribution partition-if the primary image contains corruption by copying the backup primary image from the boot disk partition into the distribution disk partition to replace the corrupted primary image.

13. The electronic device of claim 12 wherein the embedded operating system is the Linux operating system.

14. The electronic device of claim 13 wherein the primary image stored in the distribution disk partition comprises a compressed primary image archive file and an uncompressed primary image archive file and wherein the backup primary image stored within the boot partition comprises a compressed primary image archive file.

15. The electronic device of claim 14 wherein the number of routines include an initial routine and an install routine.

16. The electronic device of claim 15 wherein the initial routine checks a boot disk partition for corruption, checks a distribution disk partition for corruption and formats the distribution disk partition if corruption is found, checks the distribution disk partition for the presence of a primary image, and, if a primary image is not found, copies a backup primary image from the boot disk partition to the distribution disk partition, and checks a primary image within the distribution disk partition for corruption, and, if corruption of the primary image is found, copies a backup primary image from the boot disk partition to the distribution disk partition to replace the primary image containing the corruption.

17. The electronic device of claim 16 wherein the install routine determines if the primary image in the distribution disk partition has a more recent version label than the backup primary image in the boot disk partition, and, if the primary image in the distribution disk partition has a more recent version label than the backup primary image in the boot disk partition, rebuilds the boot disk partition and boots the initial operating system, and otherwise verifies all additional disk partitions, reformats any disk partitions that are found to be corrupted, rebuilds the additional disk partitions that have been reformatted and rebuilds all additional disk partitions if the primary image in the distribution disk partition has a later version than the primary image from which the disk partitions were originally built.

18. The electronic device of claim 15 wherein, upon booting of the electronic device, an initial operating system is loaded and executed in the context of a simulated disk partition in random access memory, the initial operating system supporting execution of the initial and install routines.

19. The electronic device of claim 18 wherein, after the initial routine finishes execution, a primary embedded operating system file system is mounted and the embedded operating system is launched.

* * * * *

UNITED STATES PATENT AND TRADEMARK OFFICE
CERTIFICATE OF CORRECTION

| | | |
|---|---|---|
| PATENT NO. | : 6,591,376 B1 | Page 1 of 1 |
| APPLICATION NO. | : 09/517026 | |
| DATED | : July 8, 2003 | |
| INVENTOR(S) | : Robert Martinez VanRooyen et al. | |

It is certified that error appears in the above-identified patent and that said Letters Patent is hereby corrected as shown below:

ON THE TITLE PAGE

Inventors Item (75), line 1, delete "VanRooven" and insert therefor --VanRooyen--

Column 8, line 14, after "confirmset=" delete ""k1"" and insert therefor --"k,"--

Signed and Sealed this

Fifteenth Day of September, 2009

David J. Kappos
*Director of the United States Patent and Trademark Office*